United States Patent
Palmer et al.

(10) Patent No.: US 6,866,350 B2
(45) Date of Patent: Mar. 15, 2005

(54) REGENERATIVE BRAKING ON AN ELECTRICAL VEHICLE WHEN TOWED

(75) Inventors: Melvin Douglas Palmer, Allen Park, MI (US); William P. Milam, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/848,050

(22) Filed: May 3, 2001

(65) Prior Publication Data

US 2002/0163249 A1 Nov. 7, 2002

(51) Int. Cl.⁷ .............................................. B60T 13/00
(52) U.S. Cl. ............... 303/152; 188/112 R; 188/112 A; 303/3; 303/20; 303/124; 303/7
(58) Field of Search .......................... 303/3, 7, 15, 124, 303/20, 152; 188/112 R, 112 A

(56) References Cited

U.S. PATENT DOCUMENTS

| 5,333,948 A | * | 8/1994 | Austin et al. ................... 303/7 |
| 5,635,804 A | * | 6/1997 | Tanaka et al. ............... 318/139 |
| 5,820,226 A | * | 10/1998 | Hart ............................... 303/7 |
| 6,516,925 B1 | * | 2/2003 | Napier et al. ............. 188/112 A |

* cited by examiner

Primary Examiner—Matthew C. Graham
(74) Attorney, Agent, or Firm—Dykema Gossett PLLC; Carlos L. Hanze

(57) ABSTRACT

Regenerative braking is actuated in an electrical vehicle during towing of the vehicle to recharge the battery and brake the vehicle. When a driver of a towing vehicle depresses the brakes of the vehicle (202), the electrical vehicle applies regenerative braking in proportion to a braking signal from the towing vehicle (206). Also, regenerative braking is applied to the electrical vehicle when the vehicle is inadvertently disconnected from a connector (110) that couples the electrical vehicle to the towing vehicle (208).

8 Claims, 2 Drawing Sheets

REGENERATIVE BRAKING ON AN ELECTRICAL VEHICLE WHEN TOWED

BACKGROUND OF THE INVENTION

1. Field of the Invention

The present invention relates generally to regenerative braking, and in particular, to actuating regenerative braking to recharge a battery of an electric or hybrid electric vehicle while the vehicle is being towed.

2. Discussion of the Prior Art

It is known to tow one vehicle with another vehicle. The circumstances surrounding the towing vary substantially. One common circumstance where one vehicle is towed by another is the case where a recreational vehicle (RV) tows a smaller vehicle, typically for local transportation when the RV is parked at a destination.

Where an automobile is the towed vehicle, a trailer is often used for the towing, to prevent damage to the transmission of the vehicle. Most states regulate the towing of vehicles, particularly where the towed vehicle exceeds a certain weight. This is because safety becomes a concern where the towed vehicle exceeds a certain weight. Typically, the regulations for heavy vehicles include that the towed vehicle be configured to brake when the towing vehicle brakes. Hence, a signal proportional to the braking on a towing vehicle is received on a trailer that is being towed to selectively brake the trailer.

Electric vehicles, including hybrid electric vehicles, produce electricity and braking torque by using a traction motor as a generator during braking. This is called regenerative braking. Energy produced by regenerative braking is used to charge a battery on the vehicle. These electric vehicles reduce the amount of emissions in the environment and increase gas mileage. In some hybrid and other electric vehicles, a regenerative braking system is used in addition to the hydraulic braking system typically used in internal combustion engine vehicles.

The proliferation of hybrid and other electric vehicles provides many opportunities to exploit the new and useful characteristics associated with these vehicles. One such adaptation is disclosed herein where the regenerative braking features of a towed electric vehicle are use to simultaneously charge a vehicle and brake a vehicle during towing, advantageously conserving energy and providing safety.

SUMMARY OF THE INVENTION

The present invention provides a method and system to actuate regenerative braking in an electric vehicle to recharge a battery while the vehicle is being towed. A first vehicle tows a second vehicle. The first vehicle is, for example, a recreational vehicle (RV), such as, a mobile home. The second vehicle is preferably one of an electric vehicle or a hybrid electric vehicle (HEV). When a driver of the first vehicle applies the brake to decrease the speed of the first vehicle, the second vehicle receives a signal in proportion to the amount of braking applied to the first vehicle. Preferably, a connector that couples the second vehicle to the first vehicle transmits this braking signal to a processor or controller of the second vehicle. The second vehicle applies regenerative braking as a function of the braking signal to simultaneously brake the second vehicle and recharge a battery of the second vehicle. The processor preferably controls the amount of regenerative braking applied to the second vehicle. And, if the second vehicle disconnects from the first vehicle during towing, then regenreative braking is applied to the second vehicle to slow and/or stop the second vehicle. This advantageously eliminates the need for a dry cell battery that is typically employed on a trialer to brake the trailer if there is an inadvertent disconnection during towing.

DETAILED DESCRIPTION OF THE PREFERRED EMBODIMENTS

Figure 1:
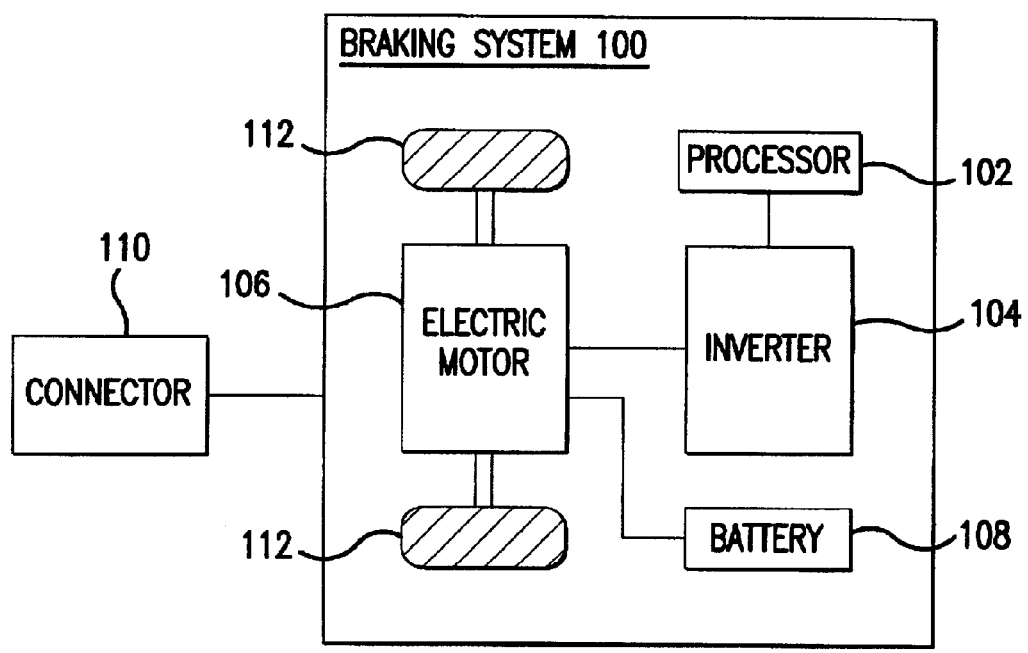
FIG. 1 is a block diagram of braking system in accordance with the present invention.

FIG. 1 is a block diagram of an automobile braking system 100 in accordance with the present invention. System 100 includes a controller or processor 102, an inverter 104, an electric motor 106 and a battery 108. Electric motor 106 is selectively coupled to wheels 112 to drive the wheels in a manner known to those of skill in the art. A connector 110 is coupled to system 100 for transmitting a braking signal in proportion to an amount of braking that is applied to a first vehicle. In addition to the braking signal, connector 110 preferably includes signals from the first vehicle to activate and indicate activation of the left and right turn signals, a brake light, a taillight, and a disconnect signal. Connector 110 electrically couples a second vehicle, including braking system 100, to the first vehicle for towing.

Processor 102 receives the braking signal from connector 110 and controls the amount of regenerative braking applied to the second vehicle. Also, processor 102 receives a disconnect signal from connector 110, where the disconnect signal indicates whether there is a disconnection between the towed and towing vehicles. Inverter 104 is coupled to electric motor 106 for supplying a current to drive or brake the motor, which generates regenerative braking. Inverter 104 converts a D.C. current from battery 108 to A.C. currents for electric motor 106. The regenerative braking recharges battery 108.

Figure 2:
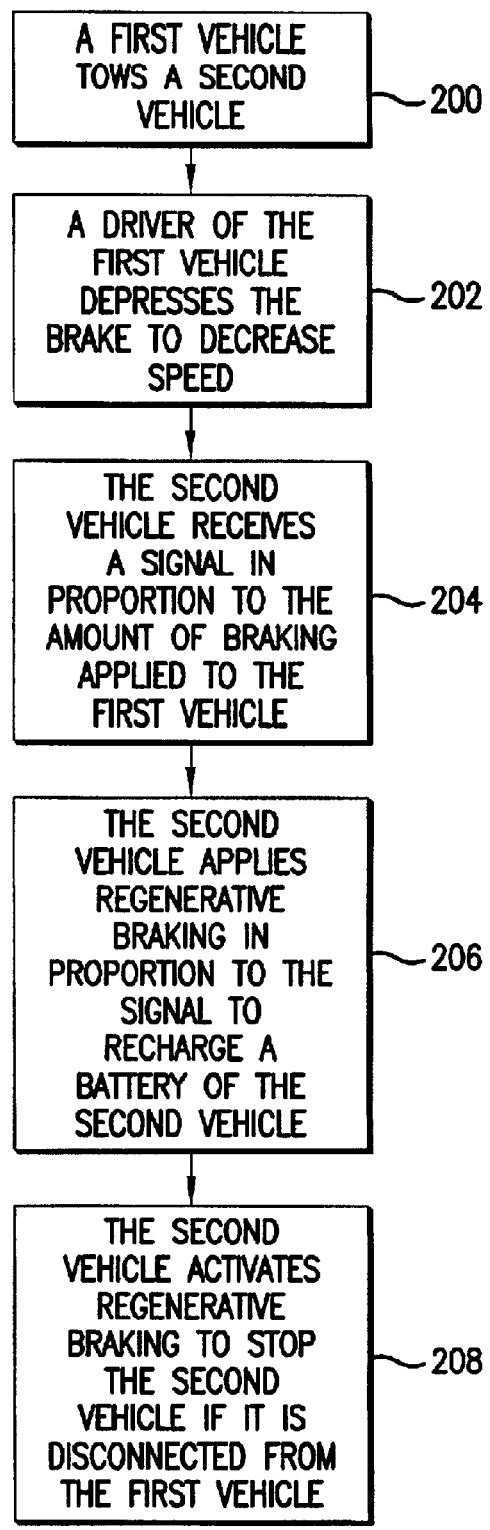
FIG. 2 is a flow chart illustrating a method to actuate regenerative braking in an electric vehicle to recharge the battery while the vehicle is being towed in accordance with the present invention.

FIG. 2 is a flow chart illustrating a method for actuating regenerative braking while an electric vehicle is being towed in accordance with the present invention. The method is described with reference to FIG. 1, as discussed above. First, a first vehicle tows a second vehicle (200). This is accomplished in a preferred embodiment by coupling the first vehicle to the second vehicle with connector 110 and any required mechanical coupling. When necessary, a driver of the first vehicle depresses a brake pedal to decrease a speed of the first vehicle (202). The second vehicle receives a signal in proportion to an amount of braking applied to the first vehicle (204). This is accomplished in the preferred embodiment by connector 110 transmitting the signal to processor 102. The second vehicle applies regenerative braking as a function of, and preferably in proportion to, the signal to recharge a battery of the second vehicle (206). In the preferred embodiment, inverter 104 drives a motor that generates regenerative braking. And, if the second vehicle is disconnected from the first vehicle, then the second vehicle activates regenerative braking (208) to slow or stop the vehicle. In the preferred embodiment, disconnection is detected and signaled via the disconnect signal from connector 110.

In alternate embodiments where the hydraulic brakes of a towed vehicle are controlled electronically, either in conjunction with regenerative braking or apart from regenerative braking, the hydraulic brakes are selectively activated during towing based on a braking signal from the towing vehicle.

The present invention actuates regenerative braking in an electric vehicle during towing to recharge the battery. When a driver of a towing vehicle depresses the brakes to decrease a speed, a braking signal in proportion to the amount of braking applied to the towing vehicle is transmitted to the towed electric vehicle. In response to the braking signal, the electric vehicle applies regenerative braking to recharge a battery of the electric vehicle and brake the electric vehicle. Advantageously, the need for stationary recharging of the battery is reduced. Also, regenerative braking stops the electric vehicle if the vehicle is inadvertently disconnected from the towing vehicle.

Whereas the present invention has been described with respect to specific embodiments thereof, it will be understood that various changes and modification will be suggested to one skilled in the art and it is intended that the invention encompass such changes and modifications as fall within the scope of the appended claims.

What is claimed is:

1. A method for activating regenerative braking in a vehicle being towed, the method comprising the steps of:
   A) receiving a signal in proportion to an amount of braking applied to a first vehicle to decrease a speed of the first vehicle, wherein the first vehicle is towing a second vehicle;
   B) applying regenerative braking to the second vehicle in proportion to the signal to recharge a battery of the second vehicle; and
   C) applying regenerative braking to the second vehicle if the second vehicle is disconnected from the first vehicle.

2. The method of claim 1 wherein the second vehicle is one of an electric vehicle or a hybrid electric vehicle.

3. An apparatus for applying regenerative braking in a vehicle comprising:

a processor that receives a braking signal from a first vehicle that is towing a second vehicle that comprises the apparatus, wherein the braking signal is proportional to an amount of braking applied to decrease a speed of the first vehicle; and
   wherein the processor determines an amount of regenerative braking to be applied by an electric motor in the second vehicle base on the braking signal to thereby decrease a speed of the second vehicle and charge a battery of the second vehicle.

4. The apparatus of claim 3 wherein the processor receives a disconnect signal that indicates whether the first vehicle is disconnected from the second vehicle and wherein if the disconnect signal indicates the second vehicle is disconnected from the first vehicle, the processor controls regenerative braking on the second vehicle to decrease the speed of the second vehicle.

5. The apparatus of claim 3 further comprising a connector that is adapted to connect with the first vehicle to provide a connection to the braking signal and at least one of a tail light signal, a brake light signal, and a turn signal.

6. A braking system comprising:
   a connector that transmits a braking signal from a first vehicle to a second vehicle, wherein the connector couples the first vehicle to the second vehicle for towing; an inverter that supplies a current to a motor of the second vehicle, wherein the motor generates regenerative braking to recharge a battery of the second vehicle;
   a processor coupled to the connector that:
   receives the braking signal from the connector; and
   controls the amount of regenerative braking applied to the second vehicle as a function of the braking signal.

7. The braking system of claim 6 wherein the connector comprises a circuit for brake control.

8. The braking system of claim 7 wherein the connector further comprises a connection for at least one of taillights, brake lights, left turn signal and right turn signal.

* * * * *